United States Patent
Thompson et al.

(10) Patent No.: US 9,962,750 B2
(45) Date of Patent: May 8, 2018

(54) SYSTEMS AND METHODS FOR FORMING A PIPE CARCASS USING MULTIPLE STRIPS OF MATERIAL

(71) Applicant: BARTELL MACHINERY SYSTEMS, L.L.C., Rome, NY (US)

(72) Inventors: Walter Frederick Thompson, Lindsay (CA); Paul David Gatley, Holland Patent, NY (US); Kenneth Brian Turvey, Clinton, NY (US)

(73) Assignee: BARTELL MACHINERY SYSTEMS, L.L.C., Rome, NY (US)

( * ) Notice: Subject to any disclaimer, the term of this patent is extended or adjusted under 35 U.S.C. 154(b) by 534 days.

(21) Appl. No.: 14/448,221

(22) Filed: Jul. 31, 2014

(65) Prior Publication Data

US 2015/0040633 A1    Feb. 12, 2015

Related U.S. Application Data

(60) Provisional application No. 61/863,226, filed on Aug. 7, 2013, provisional application No. 61/910,695, filed on Dec. 2, 2013.

(51) Int. Cl.
*B21D 5/12* (2006.01)
*B21D 5/14* (2006.01)
(Continued)

(52) U.S. Cl.
CPC ............. *B21D 5/12* (2013.01); *B21C 37/121* (2013.01); *B21C 37/126* (2013.01); *B21D 5/14* (2013.01);
(Continued)

(58) Field of Classification Search
CPC ..... B21C 37/121; B21C 37/126; B21C 37/12; B21C 37/122; B21C 37/124; B21C 37/128; B21C 49/00
See application file for complete search history.

(56) References Cited

U.S. PATENT DOCUMENTS 1,580,760 A * 4/1926 Palmer .................. B21C 37/121
    138/135
3,487,537 A * 1/1970 Lombardi ............. B21C 37/123
    228/145
(Continued)

FOREIGN PATENT DOCUMENTS

EP        0795362       *  9/1997
WO    WO92/02751        2/1992
(Continued)

OTHER PUBLICATIONS

Machine translation of EP0795362 to Schappler et al.*
(Continued)

*Primary Examiner* — R. K. Arundale
*Assistant Examiner* — Mohammad Yusuf
(74) *Attorney, Agent, or Firm* — Brinks Gilson & Lione

(57) ABSTRACT

The present embodiments are directed to systems and methods for forming a pipe carcass. In one embodiment, a first series of forming rollers are configured for forming a primary carcass strip material. A second series of forming rollers are configured for forming a second strip material into a shape different than the primary carcass strip material. The primary carcass strip material and the second strip material, after being fed through the first and second series of rollers, respectively, are each fed concurrently into a plurality of winding rolls for assembly with one another.

13 Claims, 5 Drawing Sheets

(51) Int. Cl.
    *B21D 37/12*     (2006.01)
    *B21D 11/06*     (2006.01)
    *B21D 39/03*     (2006.01)
    *B21C 37/12*     (2006.01)

(52) U.S. Cl.
    CPC ............ *B21D 11/06* (2013.01); *B21D 39/037* (2013.01); *Y10T 29/53526* (2015.01)

(56) References Cited

U.S. PATENT DOCUMENTS

| | | | |
|---|---|---|---|
| 3,694,892 A * | 10/1972 | Hale | B21C 37/121 |
| | | | 138/150 |
| 3,707,170 A | 12/1972 | Mazuir et al. | |
| 4,387,498 A | 6/1983 | Morhard | |
| 4,597,276 A * | 7/1986 | Legallais | B21C 37/121 |
| | | | 72/49 |
| 4,738,008 A * | 4/1988 | Proctor | B21C 37/12 |
| | | | 29/33 D |
| 4,783,980 A | 11/1988 | Varga | |
| 4,821,501 A * | 4/1989 | Lipp | D07B 7/14 |
| | | | 242/441.3 |
| 4,895,011 A * | 1/1990 | Varga | B21C 37/12 |
| | | | 242/364.1 |
| 5,222,288 A * | 6/1993 | Thomas | B21C 37/121 |
| | | | 29/429 |
| 5,669,420 A | 9/1997 | Herrero et al. | |
| 6,067,829 A | 5/2000 | Harmelin et al. | |
| 7,702,203 B1 | 4/2010 | Bohler et al. | |
| 9,446,439 B2 * | 9/2016 | Hof | B21C 37/123 |
| 2006/0278291 A1* | 12/2006 | Baumhoff | F16L 11/16 |
| | | | 138/135 |
| 2013/0319722 A1 | 12/2013 | McMillen | |
| 2013/0333431 A1* | 12/2013 | Russel | B21C 37/121 |
| | | | 72/49 |
| 2014/0238094 A1 | 8/2014 | Thompson et al. | |

FOREIGN PATENT DOCUMENTS

| | | |
|---|---|---|
| WO | WO99/10115 | 3/1999 |
| WO | WO13/55618 | 4/2013 |

OTHER PUBLICATIONS

Extended European Search Report for 14179988.2 dated Mar. 10, 2015, 7 pgs.
Response to EP Search Report for related application filed Sep. 15, 2015.

* cited by examiner

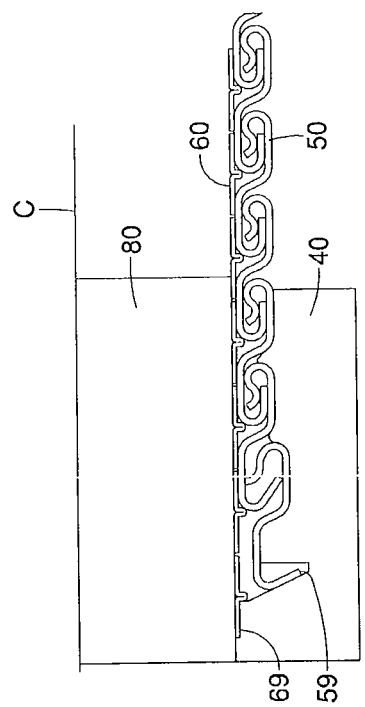
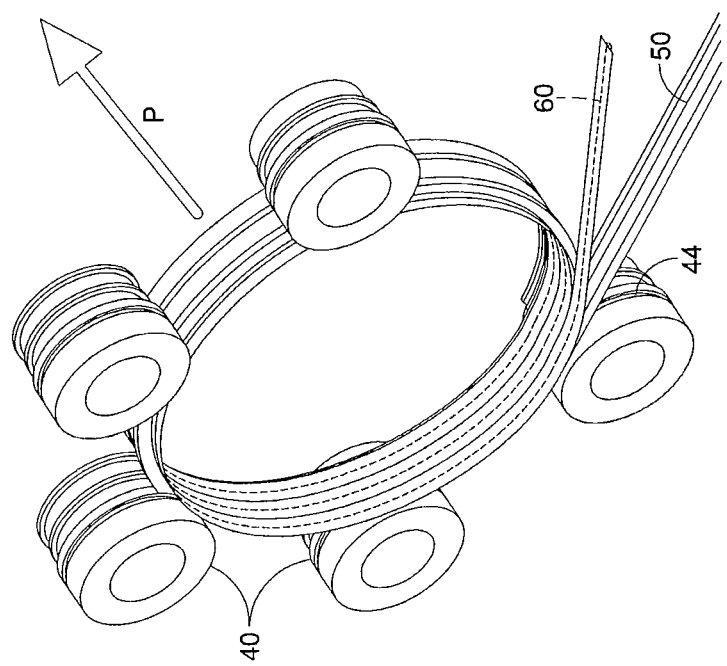
FIG. 5
FIG. 4

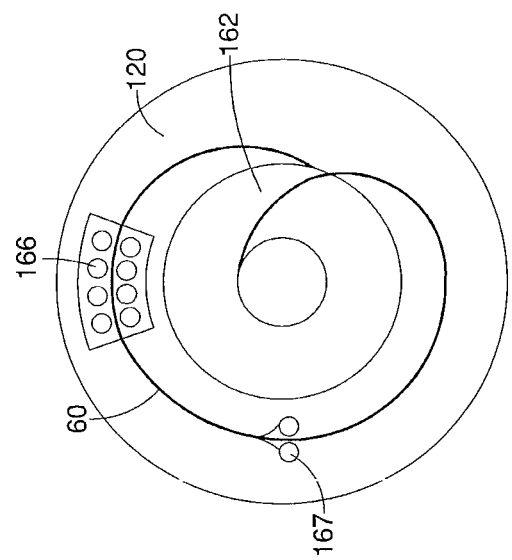
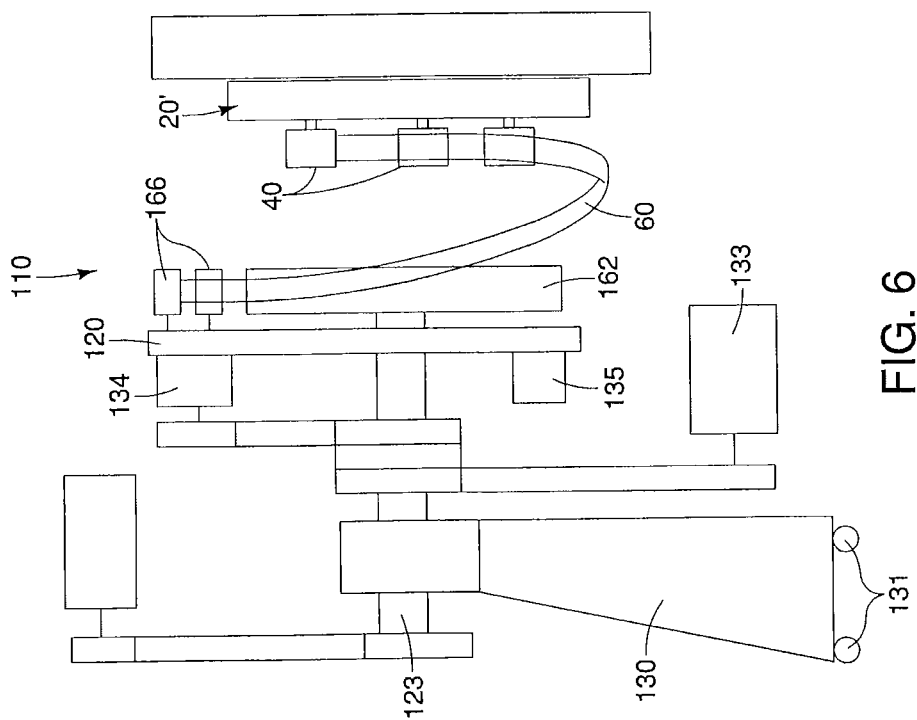
FIG. 7
FIG. 6

SYSTEMS AND METHODS FOR FORMING A PIPE CARCASS USING MULTIPLE STRIPS OF MATERIAL

PRIORITY CLAIM

This application claims the benefit of priority of U.S. Provisional Application Ser. No. 61/863,226, entitled "Systems and Methods for Forming a Pipe Carcass Using Multiple Strips of Material," filed Aug. 7, 2013, and further claims the benefit of priority of U.S. Provisional Application Ser. No. 61/910,695, entitled "Systems and Methods for Forming a Pipe Carcass Using Multiple Strips of Material," filed Dec. 2, 2013, each of the foregoing disclosures of which are hereby incorporated by reference in their entirety.

BACKGROUND

The present invention generally relates to systems and methods for forming a pipe carcass using multiple strips of material.

Carcass machines produce a carcass of a flexible pipe. A main purpose of the carcass is to prevent the pipe from collapsing under external pressure, e.g., due to water pressure and mechanical crushing during production and installation of the pipe. The collapse strength generally depends on the mechanical integrity of the metal carcass which should withstand the force of the external pressure.

Carcass machines may produce the armor carcass by the process of roll forming and winding of sheet metal strips. For example, a carcass machine may cold-form a flat steel (or other material) strip into an interlocking structure.

Typically, a flat strip of material such as steel is pulled off of a coil and is run through a series of deforming operations to form a profile of the interlocking structure. These operations are performed by pressers or rollers that gradually change the profile of the strip, and subsequent to the generation of such a strip, a winding step is used during the manufacture of the carcass for the flexible pipe body. In some examples, the carcass strip is formed into a profile having hook and valley regions, so that as the strip of material is wound, adjacent windings are interlocked together by nesting hook and valley regions. During manufacture, the shaped strip may be wound at an angle, so that the flexibility of the metal carcass produced allows the metal carcass sufficient flexibility.

It has been observed that flow-induced pulsation may occur in the flexible pipe, particularly near the open spaces of the metal carcass. The interaction between fluid flow and inner carcass geometry, among other factors, may lead to increased fatigue that affects the lifespan of the piping, particularly when used in underwater applications.

SUMMARY

The present embodiments are directed to systems and methods for forming a pipe carcass. In one embodiment, a first series of forming rollers are configured for forming a primary carcass strip material. A second series of forming rollers are configured for forming a second strip material into a shape different than the primary carcass strip material. The primary carcass strip material and the second strip material, after being fed through the first and second series of rollers, respectively, are each fed concurrently into a plurality of winding rolls for assembly with one another.

In one embodiment, the first and second series of forming rollers are coupled to a front face of a main rotor. In one example, the second series of forming rollers may be disposed on the front face of the main rotor in a concave shape relative to a pivot axis of the main rotor.

In one embodiment, a spool for holding the second strip material is coupled to the front face of the main rotor. In an alternative embodiment, a spool for holding the second strip material is spaced apart from the front face of the main rotor. In this alternative embodiment, the second series of forming rollers may be at a location spaced apart from the front face of the main rotor.

The second strip material may be guided in a pathway that is both circumferentially and axially offset from the primary carcass strip material. At least one dancer roller may be associated with the primary carcass strip material, and at least one additional dance roller may be associated with the second strip material.

In certain embodiments, the second strip material may comprise a plurality of different sections, such that a first section of the second strip material may at least partially overlap with a second section of the second strip material. In such embodiments, the first and second sections of the second strip material may each comprise a first segment that is generally parallel to a horizontal axis, and a second segment that is also generally parallel to the horizontal axis yet vertically offset from the first segment, wherein the second segment of the first section at least partially overlaps with the first segment of the second section in an assembled state. At least one of the first and second sections of the second strip material may further comprise a nesting segment disposed between the first and second segments, wherein the nesting segment extends into a gap of the primary carcass strip in an assembled state.

Advantageously, the systems and methods of the present embodiments facilitate assembly of a pipe carcass using multiple strips of material. For example, one strip of material may provide a reduction in gaps of the other strip of material, which may reduce instances of flow-induced pulsation in the flexible pipe and help reduce fatigue that affects the lifespan of the piping.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a perspective view of a schematic drawing depicting two strips being fed through winding rolls in the system of FIGS. 1-3.

FIG. 5 is a side-sectional view of a portion of the two strips of FIG. 4 during assembly.

FIG. 6 is a side view of a second embodiment of a system for forming a pipe carcass.

FIG. 7 is a front view illustrating features of one of the rotors of the system of FIG. 6.

DETAILED DESCRIPTION OF THE PREFERRED EMBODIMENTS

Figure 1:
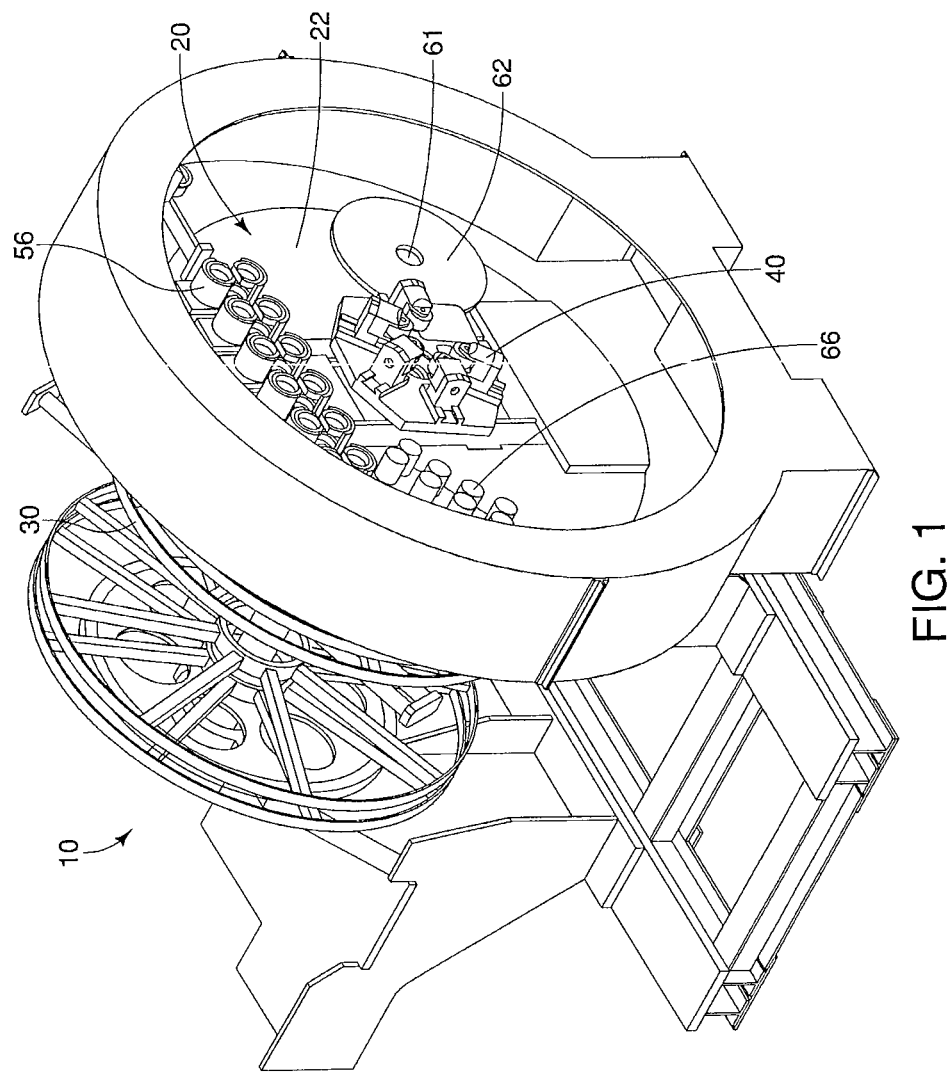
FIG. 1 is a perspective view of a first embodiment of a system for forming a pipe carcass.
Figure 3:
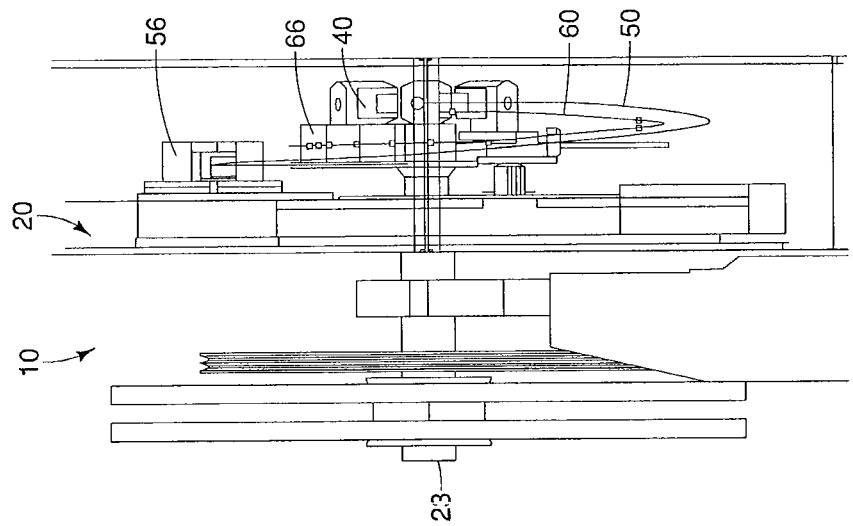
FIG. 3 is a side view of the system of FIGS. 1-2.
Figure 2:
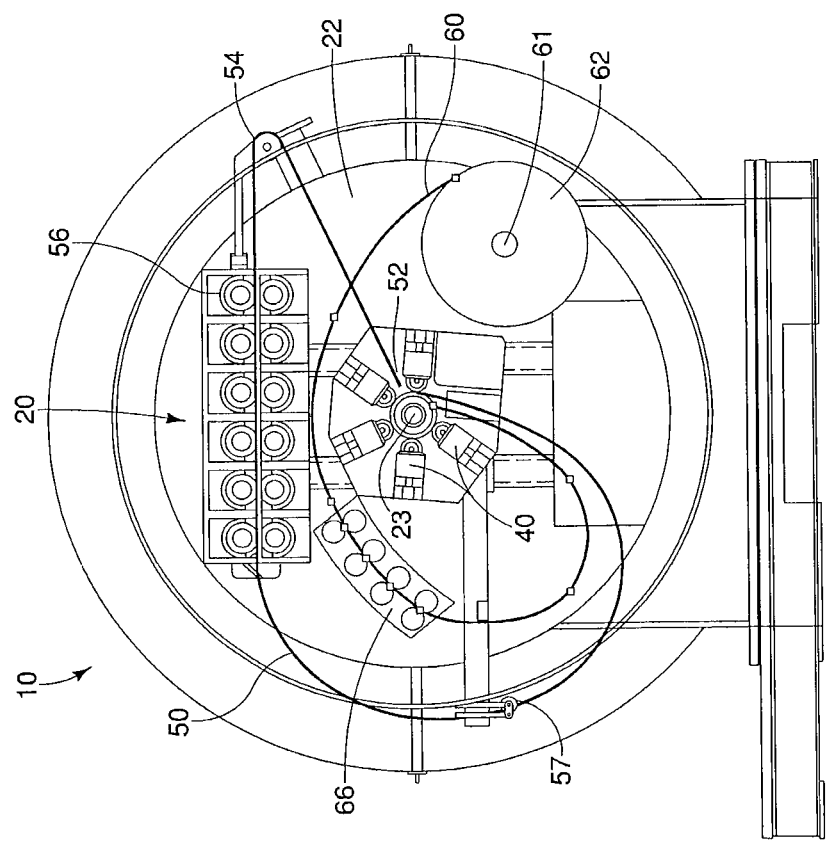
FIG. 2 is a front view of the system shown in FIG. 1.

Referring to FIGS. 1-5, a first embodiment of a system 10 for forming a pipe carcass is shown and described. The system 10 comprises a main rotor 20 that is mounted for rotatable movement around an axis 23, as depicted in FIGS. 1-3. Additionally, the system 10 comprises components that are designed to handle both a primary carcass strip material 50 and a second strip material 60, as will be explained further below.

The primary carcass strip material 50 originates from one or more coils or bobbins 30 that are positioned behind the main rotor 20, as best seen in FIG. 1. As will be appreciated, since multiple coils or bobbins 30 are provided, reloading of the primary carcass strip material 50 may be achieved during machine operation.

The primary carcass strip material 50 is fed through a series of guide elements, such as one or more redirection rollers, and ultimately is fed towards a location 52, which is near the axis 23 of the main rotor 20, as shown in FIG. 2. At location 52, the primary carcass strip material 50 extends from the rear side of the main rotor 20 over to the front side of the main rotor 20. The primary carcass strip material 50 then is guided around a guide 54 and through a series of forming rollers 56, as best seen in FIG. 2. After passing through the forming rollers 56, the primary carcass strip material 50 is then fed around dancer rollers 57, and towards winding rolls 40, which are positioned on a front face 22 of the main rotor 20, as depicted in FIG. 2.

If the primary carcass strip material 50 is cut for changeover or any other circumstance, one or more string up clamps may be engaged to prevent any unnecessary movement of the cut ends. A clamp above the coil pack may prevent the primary carcass strip material 50 from backing through the rollers and preventing the material from loosening on the coil pack, which results in a safety risk. Additionally, to facilitate the deformation of the coiled material into an unwound state and to allow for improved feeding into the apparatus, a straightening roller assembly may be used to unwind the material from the coils or bobbins 30.

The series of forming rollers 56 may form the primary carcass strip material 50 into a pre-formed profile, for example, generally having an S-shape, as shown and described further in FIGS. 4-5 below, for interlocking in a helical and tubular armor structure. As will be explained below, the second strip material 60 is used in conjunction with the primary carcass strip material 50, and manufactured in an integrated manner at the winding rolls 40, in order to achieve a desired end result, such as reduction in gaps in the generally S-shaped profile of the primary carcass strip material 50.

The system 10 comprises different components that are designed to handle the second strip material 60. In the embodiment of FIGS. 1-5, a spool mandrel 61 is coupled to the front face 22 of the main rotor 20. The spool mandrel 61 may rotatably and removably receive transferable spools 62 of the second strip material 60. The spool mandrel 61 and the spool 62, when mounted, rotate around the axis 23 along with the main rotor 20.

The second strip material 60 extends from the spool 62 through a series of forming rollers 66, as best seen in FIG. 2. The series of forming rollers 66 may form the second strip material 60 into a predetermined pre-formed profile. In the non-limiting examples shown herein, the second strip material 60 is formed into a generally T-shaped profile, as depicted in FIGS. 4-5, such that portions of the "T-shape" of the second strip material 60 will ultimately extend into the gaps in the generally S-shaped profile of the primary carcass strip material 50, as explained further below. It should be noted that while a "T-shape" of the second strip material 60 is generally depicted herein, the predetermined shape imparted to the second strip material 60 by the forming rollers 66 may comprise other shapes, including but not limited to round, flat, triangular, and the like. Specific alternative shapes of the second strip material 60 are explained in further detail in FIGS. 8-9 and FIGS. 10-11 below. It is noted that the second strip material 60 may comprise stainless steel, or alternatively may comprise plastic, brass, or another suitable material.

After passing through the forming rollers 66, the second strip material 60 then is fed around dancer rollers and towards winding rolls 40. Suitable dancer rollers 167 are shown in FIG. 7, and similar dancer rollers would be positioned between the forming rollers 66 and winding rolls 40 in the embodiment of FIGS. 1-3.

The second strip material 60 may be guided in a pathway that is both circumferentially and axially offset from the primary carcass strip material 50. In particular, the second strip material 60 may be guided in a pathway that is generally more radially inward relative to the primary carcass strip material 50, as best seen in FIG. 2. Further, the second strip material 60 may be guided in a pathway that is axially spaced apart from the primary carcass strip material 50, i.e., in a direction away from the front face 22 of the main rotor 20.

Further, the series of forming rollers 66 used in conjunction with the second strip material 60 may be positioned in a radially curved shape, for example, having a concave shape relative to the axis 23 of the main rotor 20. Advantageously, the radially curved shape of the series of forming rollers 66 may allow the second strip material 60 to bend into a smaller radius relative to the primary carcass strip material 50, as shown in FIG. 2. Furthermore, the radially curved shape of the series of forming rollers 66 provides space-saving advantages by at least partially following an outer shape of the main rotor 20 and facilitates the provision of both series of forming rollers 56 and 66 on the front face 22 of the main rotor 20.

Referring to FIGS. 4-5, during operation, both the primary carcass strip material 50 and the second strip material 60 have been fed towards the winding rolls 40, in the manner described above. The winding rolls 40 facilitate manufacture of the strips 50 and 60 from their pre-formed shapes into a folded down, assembled interlocking position, as depicted in FIG. 5. The assembled carcass comprising both strips 50 and 60 is then wound around a support mandrel 80 to form a preferred pipe diameter. For reference purposes, it can be noted that direction P of FIG. 4 refers to direction in which the pipe is formed, and line C of FIG. 5 refers to a centerline of the pipe.

A leading edge 69 of the second strip material 60 may be fed into the winding rolls 40 before a leading edge 59 of the primary carcass strip material 50, as depicted in FIG. 5. An outer surface 42 of the winding rolls 40 may be shaped to match an outer surface of the primary carcass strip material 50.

The second strip material 60 is generally circumferentially internal to the primary carcass strip material 50, as shown in FIGS. 4-5. In this manner, the second strip material 60 is used in conjunction with the primary carcass strip material 50, and manufactured in an integrated manner and fed at the same entrance point at the winding rolls 40, in order to achieve a desired end result, such as reduction in gaps in the generally S-shaped profile of the primary carcass strip material 50. Advantageously, the reduction in gaps in the generally S-shaped profile of the primary carcass strip material 50, as shown in FIG. 5, may reduce instances of flow-induced pulsation in the flexible pipe, particularly near the open spaces of the metal carcass. Using the systems and methods for forming a carcass as described herein, fatigue that affects the lifespan of the piping may be reduced, particularly when used in underwater applications.

Referring now to FIGS. 6-7, a second embodiment of a system 110 for forming a pipe carcass is shown and described. The system 110 of FIGS. 6-7 is similar to the system 10 of FIGS. 1-5, and achieves the same final assembled product and advantages associated therewith, with a main exception that components associated with the second strip material 60 are moved away from the front face 22 of the main rotor 20. In FIG. 6, an alternative main rotor 20' is similar to the main rotor 20 of FIGS. 1-3, with a main exception that the spool and forming rollers associated with the second strip material 60 are moved away from the alternative main rotor 20', as explained below. It should be noted that, in the schematic of FIG. 6, various other components that would remain coupled to the front face of the alternative main rotor 20' are not shown for illustrative purposes, such as the forming rollers 56.

In the embodiment of FIGS. 6-7, the system 110 comprises a rotor 120 associated with pre-formation of the second strip material 60. The rotor 120 is separate and distinct from the main rotor 20'. A spool 162, which may be similar to the spool 62 of FIGS. 1-3 above, is disposed on the rotor 120 and holds a supply of the second strip material 60. A series of forming rollers 162, which may be similar to the forming rollers 162 of FIGS. 1-3 above, is disposed on the rotor 120 and forms the second strip material 60 into a desired pre-formed shape in the manner described above.

The rotor 120 associated with pre-formation of the second strip material 60 may be operatively coupled to a base 130 having a plurality of wheels 131. In this manner, a user may move the equipment associated with pre-formation of the second strip material 60 back and forth to a suitable location in proximity adjacent to the front face of the main rotor 20'.

A series of linkages may be used in conjunction with exemplary motors 132 and 133, gears 134, and a counterweight 135 for effecting operation of the rotor 120 in a manner that allows the second strip material 60 to be fed in a direction from the spool 162 through the forming rollers 166. After passing through the forming rollers 166, the second strip material 60 is fed through dancer rollers 167, as shown in FIG. 7, and then are fed into the winding rolls 40 coupled to the main rotor 20', as depicted in FIG. 6. The winding rolls 40 subsequently facilitate manufacture of the strips 50 and 60 from their pre-formed shapes into a folded down, assembled interlocking position, as depicted in FIG. 5 above. At this stage, further operational steps are generally the same as those described with respect to FIGS. 4-5, above.

Advantageously, in the embodiment of FIGS. 6-7, the stand-alone equipment associated with the second strip material 60 can be easily used in conjunction with a pre-existing carcass formation machine that is designed to accommodate a primary carcass strip 50. No modifications to the front face of the pre-existing carcass formation machine are required. The second strip material 60 is simply fed in a manner that meets up with the primary carcass strip 50 at the pre-existing carcass formation machine, and at that point the strips 50 and 60 may be integrated in a manner that solves any potential drawbacks, such as gaps, that may arise when the primary carcass strip 50 is manufactured alone. Additionally, by having the ability to move the equipment associated with the second strip material 60 in a back and forth manner via the base 130 and the wheels 131, the position of the spool 162 may be varied relative to the pre-existing carcass machine as needed during operation.

Figure 9:
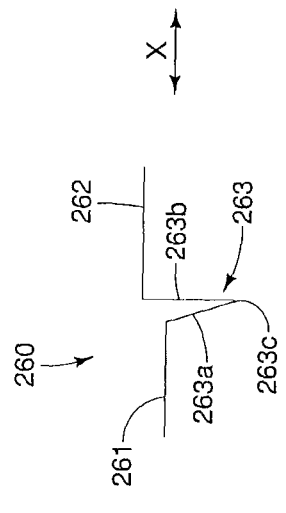
FIGS. 8-9 are, respectively, a side-sectional view of alternative second strip segments disposed at least partially within gaps of a primary carcass strip, and an isolated view of the alternative second strip segment.
Figure 8:
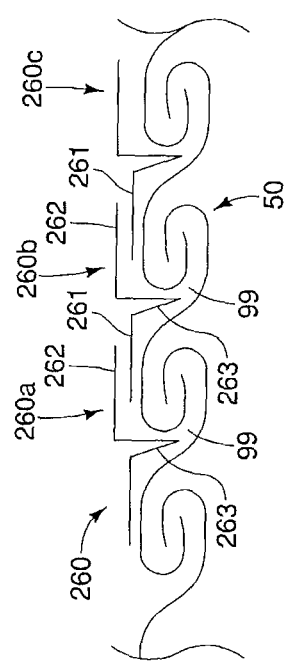

Referring now to FIGS. 8-11, different embodiments of the second strip material are shown and described. In FIGS. 8-9, an alternative second strip material 260 comprises a plurality of different sections that at least partially overlap with one another. In the illustrative example, the second strip material 260 comprises first, second and third sections 260a-260c. The first section 260a at least partially overlaps with the second section 260b, and the second section 260b at least partially overlaps with the third section 260c, as shown in FIG. 8. While three sections 260a-260c are depicted, it will be appreciated that any number of sections may be provided in the manner depicted in FIG. 8.

In the embodiment of FIGS. 8-9, a section of the second strip material 260 comprises a first segment 261 that is generally parallel to a horizontal axis x, as depicted in FIG. 9. The section of the second strip material 260 further comprises a second segment 262 that is also generally parallel to the horizontal axis x, but is positioned vertically above the first segment 261 with respect to the horizontal axis x, as further seen in FIG. 9.

A nesting segment 263 is disposed between the first and second segments 261 and 262, as depicted in FIGS. 8-9. The nesting segment 263 may be disposed vertically beneath each of the first and second segments 261 and 262, relative to the horizontal axis x, as depicted in FIG. 9.

The nesting segment 263 comprises first and second portions 263a and 263b, which transition relative to each other at a location 263c. Accordingly, in an overall sequential manner, the first segment 261 transitions into the first portion 263a of the nesting segment 263, the first and second portions 263a and 263b of the nesting segment 263 meet up at the location 263c, and the second portion 263b of the nesting segment 263 transitions into the second segment 262, as depicted in FIGS. 8-9.

In one embodiment, the first and second portions 263a and 263b of the nesting segment 263 may be angled relative to one another. For example, main bodies of the first and second portions 263a and 263b may be aligned at an angle of between about 3 degrees to about 45 degrees relative to one another, as generally depicted in FIG. 9.

In an assembled state, the second strip material 260 is coupled to the primary carcass strip material 50, such that the nesting segments 263 of each of the sections 260a-260c extend into gaps 99 in the generally S-shaped profile of the primary carcass strip material 50, as depicted in FIG. 8. If the first and second portions 263a and 263b of the nesting segments 263 are angled relative to one another, an enhanced nesting alignment within the gaps 99 may be achieved. In particular, the first portion 263a, which may be angled relative to both horizontal and vertical axes, closely matches an interior geometry of the generally S-shaped profile of the primary carcass strip material 50, as shown in FIG. 8.

Further, in the assembled state, the second segment 262 of the first section 260a at least partially overlaps with the first segment 261 of the second section 260b, and the second segment 262 of the second section 260b at least partially overlaps with the first segment 261 of the third section 260c, as shown in FIG. 8. In this manner, because the adjacent sections 260a-260c of the second strip material 260 at least partially overlap with one another along the horizontal axis x, a supporting framework is provided for the adjacent sections 260a-260c.

Advantageously, the at least partial overlap among sections 260a-260c of the second strip material 260 creates a more secure, interlocking-style fit for the second strip material 260 during placement within the primary carcass strip material 50, and creates a smoother flow path for fluids flowing through the flexible pipe. In particular, the at least partial overlap among sections 260a-260c of the second strip material 260 may reduce instances of flow-induced pulsation in the flexible pipe, particularly near the open spaces of the metal carcass. Using the systems and methods for forming a carcass as described herein, fatigue that affects the lifespan of the piping may be reduced, particularly when used in underwater applications.

Figure 11:
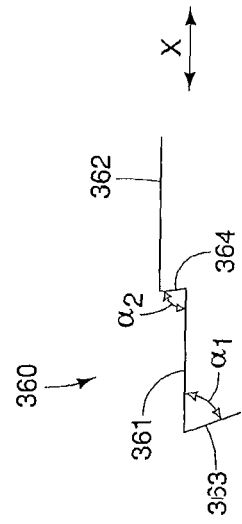
FIGS. 10-11 are, respectively, a side-sectional view of further alternative second strip segments disposed at least partially within gaps of a primary carcass strip, and an isolated view of the further alternative second strip segment.
Figure 10:
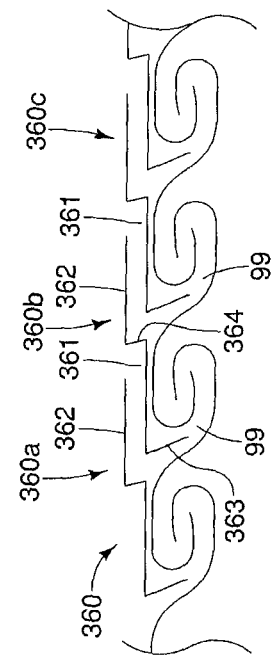

Referring now to FIGS. 10-11, a further alternative second strip material 360 comprises a plurality of different sections that at least partially overlap with one another. In the illustrative example, second strip material 360 comprises first, second and third sections 360a-360c. The first section 360a at least partially overlaps with the second section 360b, and the second section 360b at least partially overlaps with the third section 360c, as shown in FIG. 10. As with the embodiment of FIGS. 8-9, while three sections 360a-360c are depicted in FIG. 10, it will be appreciated that any number of sections may be provided in the manner shown.

In the embodiment of FIGS. 10-11, a section of the second strip material 360 comprises a first segment 361 that is generally parallel to the horizontal axis x, as depicted in FIG. 11. The section of the second strip materials 360 further comprises a second segment 362 that is also generally parallel to the horizontal axis x, but is positioned vertically above the first segment 361 with respect to the horizontal axis x, as further seen in FIG. 11. A transition segment 364 is disposed between the first and second segments 361 and 362, and may provide the vertical height difference between the first and second segments 361 and 362, as depicted in FIGS. 10-11.

A nesting segment 363 is disposed at an end of the first segment 361, at a location opposite the end at which the second segment 362 is positioned, as depicted in FIGS. 10-11. The nesting segment 363 may be disposed vertically beneath each of the first and second segments 361, relative to the horizontal axis x, as depicted in FIG. 11.

The nesting segment 363 may be disposed at an angle $\alpha_1$ relative to the first segment 361. In one embodiment, the angle $\alpha_1$ is between about 45 degrees and about 89 degrees. Further, the transition segment 364 may be disposed at an angle $\alpha_2$ relative to the first segment 361. In one embodiment, the angle $\alpha_2$ is between about 55 degrees and about 110 degrees. As noted above, the angle $\alpha_2$ of the transition segment 364 provides the vertical height difference between the first and second segments 361 and 362.

In an assembled state, the first, second and third sections 360a-360c of the second strip material 360 are coupled to the primary carcass strip material 50, such that the nesting segments 363 of each section extend into gaps 99 in the generally S-shaped profile of the primary carcass strip material 50, as depicted in FIG. 10. If the nesting segment 363 is angled relative to the first segment 361, an enhanced nesting alignment within the gaps 99 may be achieved. In particular, the nesting segment 363 being angled relative to the horizontal axis x may more closely match an interior geometry of the generally S-shaped profile of the primary carcass strip material 50, as shown in FIG. 10.

Further, in the assembled state, the second segment 362 of the first section 360a at least partially overlaps with the first segment 361 of the second section 360b, and the second segment 362 of the second section 360b at least partially overlaps with the first segment 361 of the third section 360c, as shown in FIG. 10. In this manner, because the adjacent sections 360a-360c of the second strip material 360 at least partially overlap with one another, a supporting framework is provided for the adjacent sections 360a-360c of the second strip material 360 along the horizontal axis x.

The embodiment of FIGS. 10-11 may achieve similar advantages as the embodiment of FIGS. 8-9, as noted above. As one example, the at least partial overlap among sections 360a-360c of the second strip material 360 creates a more secure, interlocking-style fit for the second strip material 360 during placement within the primary carcass strip material 50, and creates a smoother flow path for fluids flowing through the flexible pipe. In particular, the at least partial overlap among sections 360a-360c of the second strip material 360 may reduce instances of flow-induced pulsation in the flexible pipe, particularly near the open spaces of the metal carcass. Using the systems and methods for forming a carcass as described herein, fatigue that affects the lifespan of the piping may be reduced, particularly when used in underwater applications.

In the embodiments of FIGS. 8-9 and FIGS. 10-11, it will be appreciated that formation of the second strip materials 260 and 360 may be provided using similar techniques as forming the "T-shape" of the second strip material 60 that was described above, but with only slight tooling modifications to support the different shapes of the second strip materials. Further, the second strip materials 260 and 360 may be engaged to the primary carcass strip material 50, using either the systems and methods of FIGS. 1-5 above, or the more "stand-alone" system and method of FIGS. 6-7 as described above.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:
1. A system for forming a pipe carcass, the system comprising:
   a first series of forming rollers configured for forming a primary carcass strip material;
   a second series of forming rollers configured for forming a second strip material into a shape different than the primary carcass strip material,
   wherein the primary carcass strip material and the second strip material, after being fed through the first and second series of rollers, respectively, are each fed concurrently at the same entrance point into a plurality of winding rolls for assembly with one another; and a main rotor being rotatable about a pivot axis, wherein the first and second series of forming rollers are coupled to a front face of the main rotor.

2. The system of claim 1, wherein the plurality of winding rolls are coupled to the front face of the main rotor.

3. The system of claim 1, wherein the second series of forming rollers are disposed on the front face of the main rotor in a concave shape relative to a pivot axis of the main rotor.

4. The system of claim 1, wherein a spool for holding the second strip material is coupled to the front face of the main rotor.

5. The system of claim 1, wherein the second strip material is guided in a pathway that is both circumferentially and axially offset from the primary carcass strip material.

6. The system of claim 1, further comprising at least one dancer roller associated with the primary carcass strip material, and at least one additional dance roller associated with the second strip material.

7. The system of claim 1, wherein the second strip material comprises a plurality of different sections, wherein a first section of the second strip material at least partially overlaps with a second section of the second strip material.

8. The system of claim 7, wherein the first and second sections of the second strip material each comprise a first segment that is generally parallel to a horizontal axis, and a second segment that is also generally parallel to the horizontal axis yet vertically offset from the first segment, wherein the second segment of the first section at least partially overlaps with the first segment of the second section in an assembled state.

9. The system of claim 8, wherein at least one of the first and second sections of the second strip material further comprises a nesting segment disposed between the first and second segments, wherein the nesting segment extends into a gap of the primary carcass strip in an assembled state.

10. The system of claim 9, wherein first and second portions of the nesting segment are angled relative to each other.

11. The system of claim 8, wherein at least one of the first and second sections of the second strip material further comprises a nesting segment disposed at an end of the first segment that is opposite the end at which the second segment is positioned, wherein the nesting segment extends into a gap of the primary carcass strip in an assembled state.

12. The system of claim 11, wherein the nesting segment is angled relative to the first segment.

13. A system for forming a pipe carcass, the system comprising:

a first series of forming rollers configured for forming a primary carcass strip material; and a second series of forming rollers configured for forming a second strip material into a shape different than the primary carcass strip material, wherein the primary carcass strip material and the second strip material, after being fed through the first and second series of rollers, respectively, are each fed concurrently into a plurality of winding rolls for assembly with one another, wherein the first series of forming rollers are collectively arranged in a different shape relative to the second series of forming rollers, wherein the first series of forming rollers are collectively arranged in a straight shape, and the second series of forming rollers are collectively arranged in a curved shape.

* * * * *